(12) United States Patent
Castro Castro et al.

(10) Patent No.: US 9,374,307 B2
(45) Date of Patent: Jun. 21, 2016

(54) GROUP SESSION MANAGEMENT FOR POLICY CONTROL

(75) Inventors: Fabian Castro Castro, Madrid (ES); Ana Maria Lopez Nieto, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 472 days.

(21) Appl. No.: 13/146,483

(22) PCT Filed: Jan. 27, 2009

(86) PCT No.: PCT/EP2009/050889
§ 371 (c)(1),
(2), (4) Date: Oct. 12, 2011

(87) PCT Pub. No.: WO2010/086013
PCT Pub. Date: Aug. 5, 2010

(65) Prior Publication Data
US 2012/0023246 A1      Jan. 26, 2012

(51) Int. Cl.
*G06F 15/16* (2006.01)
*H04L 12/801* (2013.01)
(Continued)

(52) U.S. Cl.
CPC ............ *H04L 47/10* (2013.01); *H04L 12/1407* (2013.01); *H04L 41/0893* (2013.01); *H04L 47/11* (2013.01); *H04L 47/12* (2013.01); *H04L 47/20* (2013.01); *H04L 47/41* (2013.01); *H04W 4/08* (2013.01); *H04W 4/24* (2013.01); *H04W 72/005* (2013.01); *H04L 65/1069* (2013.01); *H04L 65/80* (2013.01); *H04L 69/24* (2013.01); *H04W 24/08* (2013.01)

(58) Field of Classification Search
CPC .................................................. H04L 12/1407

USPC ...................... 709/223–229; 370/230, 395.21
See application file for complete search history.

(56) References Cited

U.S. PATENT DOCUMENTS 8,331,229 B1 * 12/2012 Hu et al. ....................... 370/230
2007/0140299 A1 * 6/2007 Hofmann et al. ............. 370/486
(Continued)

FOREIGN PATENT DOCUMENTS

| CN | 101 227 714 | 7/2008 |
|----|-------------|--------|
| WO | WO 2009/006630 | 1/2009 |

OTHER PUBLICATIONS

International Search Report for PCT/EP2009/050889, mailed Nov. 9, 2009.
(Continued)

*Primary Examiner* — Aftab N. Khan
(74) *Attorney, Agent, or Firm* — Nixon & Vanderhye, P.C.

(57) ABSTRACT

At present some situations occur where a policy control at individual user level is not enough. For example, where a plurality of users surpasses a load limit in a certain location area, which could imply a risk of network congestion, policy control decisions in conventional architectures have to be made by submitting corresponding orders for each user affected by the decision, thus resulting in a higher signalling and processing load. To overcome these drawbacks, the present specification provides for new network entities and method to monitor and control a plurality of users, as dynamically determined according to different selection criteria, in order to compile users-related aggregated reports, to establish dynamic group of users whom specific policy control rules can be applied, and to map orders and information between group and user level.

16 Claims, 14 Drawing Sheets

(51) Int. Cl.
*H04L 12/14* (2006.01)
*H04W 4/24* (2009.01)
*H04L 12/24* (2006.01)
*H04L 12/813* (2013.01)
*H04L 12/891* (2013.01)
*H04W 72/00* (2009.01)
*H04W 4/08* (2009.01)
*H04W 24/08* (2009.01)
*H04L 29/06* (2006.01)

(56) References Cited

U.S. PATENT DOCUMENTS

| | | | |
|---|---|---|---|
| 2007/0156897 A1* | 7/2007 | Lim | 709/225 |
| 2009/0141625 A1* | 6/2009 | Ghai et al. | 370/230 |
| 2009/0182883 A1* | 7/2009 | Giaretta et al. | 709/228 |
| 2009/0225719 A1 | 9/2009 | Zhi et al. | |
| 2010/0017846 A1* | 1/2010 | Huang et al. | 726/1 |
| 2010/0074110 A1* | 3/2010 | Huang et al. | 370/230 |
| 2010/0121960 A1* | 5/2010 | Baniel et al. | 709/228 |
| 2010/0146131 A1* | 6/2010 | Hu et al. | 709/228 |
| 2010/0154029 A1* | 6/2010 | Fernandez Alonso et al. | 726/1 |
| 2011/0208853 A1* | 8/2011 | Castro-Castro et al. | 709/223 |
| 2012/0021741 A1* | 1/2012 | Pancorbo Marcos et al. | 455/433 |
| 2012/0084425 A1* | 4/2012 | Riley et al. | 709/223 |
| 2012/0216249 A1* | 8/2012 | Fernandez Alonso et al. | 726/1 |
| 2013/0013794 A1* | 1/2013 | Hu et al. | 709/227 |

OTHER PUBLICATIONS

Written Opinion of the International Searching Authority for PCT/EP2009/050889, mailed Nov. 9, 2009.

3GPP TS 23.203 v8.1.1 (Mar. 2008) 3$^{rd}$ Generation Partnership Project; Technical Specification Group Services and System Aspects; Policy and Charging Control Architecture (Release 8), pp. 1-87.

3GPP TS 29.212 V8.1.0+ (Oct. 2008) 3$^{rd}$ Generation Partnership Project; Technical Specification Group Core Network and Terminals; Policy and Charging Control over Gx reference point (Release 8), Oct. 2008, pp. 1-67.

* cited by examiner

GROUP SESSION MANAGEMENT FOR POLICY CONTROL

This application is the U.S. national phase of International Application No. PCT/EP2009/050889, filed 27 Jan. 2009, which designated the U.S., the entire contents of which is hereby incorporated by reference.

TECHNICAL FIELD

The present invention relates to policy control for a Policy and Charging Control architecture. More specifically, the present invention relates to policy control mechanisms to be simultaneously triggered for a plurality of users in order to, for instance, improve network performance, save network resources, provide customizable user services, or combinations thereof.

BACKGROUND

A currently developed Policy and Charging Control (hereinafter PCC) architecture permits to integrate both policy and charging control, whilst optimizing the information flow.

The development of PCC standards is growing with different versions and, in particular, the invention is appreciably suitable for a PCC architecture in accordance with TS 23.203 (V.8.1.1) for Evolved 3GPP Packet Switched domain (wherein 3GPP stands for "3rd Generation Partnership Project"), including both 3GPP accesses (GERAN/UTRAN/E-UTRAN) and Non-3GPP accesses.

Generally speaking, the PCC architecture comprises an Application Function (hereinafter AF), a Policing and Charging Rules Function (hereinafter PCRF), a Policing and Charging Enforcement Function (hereinafter PCEF) and a Subscription Profile Repository (hereinafter SPR), as illustrated in FIG. 1.

In accordance with PCC standards, an AF is as an element offering applications the control of IP bearer resources according to what has been negotiated in the signalling layer; the AF communicates with the PCRF to transfer dynamic session information, namely description of the media to be delivered in the transport layer. The PCRF is the function providing policy and charging control for media components negotiated from a user equipment (hereinafter UE) of a user through the AF; the PCRF creates PCC rules based on the information received from the AF and to be installed in the PCEF. The PCEF encompasses service data flow detection based on filters included in the PCC rules, as well as online and offline charging interactions and policy enforcement. The SPR provides subscription information regarding quality of service (hereinafter QoS) parameters subscribed by the user such as bandwidth and others.

A current PCC behaviour is exemplary illustrated in FIG. 2 wherein a UE accesses a streaming server. In this exemplary PCC architecture, the UE connects to a streaming server and negotiates the session. During the session negotiation the IP ports used by the end points, the type of media (audio, video, etc.) and the QoS parameters are defined. Then, the streaming server provides the session information that has been negotiated to the PCRF. The PCRF checks that the session information received is in accordance with the operator defined policies, stores the service information and responds with acknowledgement to the application server. Subsequently, the PCRF sends a so-called RAR message to request that a gateway (hereinafter GW), which includes a PCEF, installs, modifies or removes PCC rules. Once a proper action has been taken with the PCC rules, the GW sends an RAA to acknowledge the previous RAR, initiates a procedure to create or update a so-called PDP context request message, and sends back to the PCRF required notifications with a so-called CCR message. Eventually, the PCRF stores the information received in said notifications and acknowledges the CCR back with a so-called CCA message.

At present, an IP-Connectivity Access Network (hereinafter IP-CAN) session is the association between a UE and an IP network. This association is identified by a UE IP address together with UE identity information, if available. An IP-CAN session incorporates one or more IP-CAN bearers. Support for multiple IP-CAN bearers per IP-CAN session is IP-CAN specific. An IP-CAN session exists as long as the UE IP address is established and announced to the IP network. For the sake of simplicity, IP-CAN session may be also referred to as 'user session' throughout this invention disclosure.

In a conventional PCC architecture, the PCRF thus receives information of each particular user session, and takes actions over each particular user session.

However, in some situations, a policy control at individual user level is not enough. For example, a control of the aggregated load generated by a plurality of users in a certain location area may be essential in order to avoid network congestion. In principle, this plurality of users cannot be pre-defined since it is not known beforehand what users will be responsible for such network congestion.

In situations like this, or where the plurality of users has surpassed a load limit in a certain location area, which could imply a risk of network congestion, an apparently suitable solution may be the downgrading of the quality of service for every user, or for a subset of users, in the plurality of users. However, this is not a suitable solution fitting user expectations.

Nowadays, where a decision has to be taken at the PCC architecture affecting a plurality of users, a plurality of corresponding orders has to be sent for each user affected, thus resulting in a higher signalling and processing load.

SUMMARY

The present invention is aimed to at least minimize the above drawback and provides for new network entities and method to monitor and control a plurality of users, as dynamically determined according to different selection criteria, to compile users-related aggregated reports, and to map orders and information between group and user level.

In particular, for the purposes of the present invention, conventional network nodes or devices of a PCC architecture, such as PCRF, PCEF, or AF, may be replaced by simpler network nodes or devices with a reduced functionality, as compared with the ones specified in the corresponding technical specifications, and inasmuch as said simpler network nodes or devices fulfil the expectations of the invention. For instance, a simpler and lighter policy enforcement device may replace and enhance a conventional PCEF of a PCC architecture and a simpler and lighter policy decision server may replace and enhance a conventional PCRF of the PCC architecture. Nevertheless, the conventional PCEF and PCRF of the PCC architecture may as well be enhanced to incorporate the features disclosed throughout the present specification thus offering similar advantages.

In accordance with a first aspect of the present invention, there is provided a new method of handling and controlling resources in the bearer plane for a plurality of users.

This method comprises the steps of: indicating from a policy enforcement device, in particular a PCEF, towards a policy decision server, in particular a PCRF, the establishment of a session for a user through an IP Connectivity Access Network (hereinafter IP-CAN session); generating at the policy decision server a user session for said user, and policy control rules, in particular PCC rules as described in PCC specifications, applicable to said user session; determining, at the policy decision server, at least one criterion to monitor this user along with other users in a group of users; associating, at the policy decision server, the user session for the user with a group session for the at least one criterion; determining, at the policy decision server, policy control rules applicable to said group session; downloading from the policy decision server towards the policy enforcement device the policy control rules applicable to said user session and the policy control rules applicable to said group session, and indicating respective events to be reported; installing the received policy control rules and associating the IP-CAN session with the group session at the policy enforcement device; and applying at the policy enforcement device the policy control rules applicable to the group session to all IP-CAN sessions associated with the group session.

Since in this method information about the group session is exchanged between the policy decision server and the policy enforcement device, the group session may advantageously be identified by a session group identifier.

On the other hand, a user session for a user may be associated with more than one group session. In other words, a user may be monitored along with more than one group of users.

Generally speaking, this method is advantageous to take actions at a group level as a response to certain events. To this end, responsive to an event, the method may further comprise a step of submitting from the policy decision server towards the policy enforcement device an indication to either confirm, or modify, or terminate or replace the current policy control rules for the group session.

In this respect, the event to be responded may be an event selected from: events triggered from the policy enforcement device; internal events detected at the policy decision server; and events notified to the policy decision server from an external entity such as a provisioning system, an AF device, or both.

In an embodiment of the invention, the needs for creating the group session is determined by the policy decision server, which thus indicates it to the policy enforcement device, but it is the latter the one creating the group session and informing the former. Where this embodiment is preferred, the step of determining in this method at least one criterion to monitor this user with other users in a group includes a step of notifying the at least one criterion towards the policy enforcement device; a step of generating a new group session at the policy enforcement device; a step of receiving from the policy enforcement device an identifier of a session group for the group session; and, where the identifier of the session group identifies a new group session, a step of generating at the policy decision server policy control rules applicable to the new group session.

In another embodiment of the invention, both the needs for creating the group session as well as the creation of the group session are carried out at the policy decision server. Where this embodiment is the preferred one, the step of associating the user session for the user with a group session may include a step of generating a new group session at the policy decision server for the at least one criterion, and a step of generating policy control rules applicable to the new group session. Alternatively in this embodiment, where a new group session is not necessary, the step of associating the user session for the user with a group session may include a step of determining an already existing group session for the at least one criterion.

Generally speaking for this method, the at least one criterion to monitor the user with the group of users may be selected from a plurality of criteria including: type of subscription, location area, service usage, corporate users, and combinations thereof.

In particular, the criterion related to type of subscription may include an indication of ordinal importance of the subscription, wherein this ordinal importance may further include an indicator selected from: first class or "gold", second class or "silver", or third class or "bronze".

Also in particular, the criterion related to location area may include at least one indication selected from: a radio network area where the user is roaming, and an area with high congestion. Advantageously, the radio network area may correspond to an area requiring a special treatment in terms of QoS, access, charging, contents insertion, etc, such as airports or shopping centres; or the radio network area may correspond to a location area corresponding to a country region where a service may be tailored according to region particularities, such as a particular language.

Moreover, the criterion related to service usage may include an indication of the type of service, this indication selected from: peer-to-peer service, end-to-end service, downloading, uploading and location-based-service. Generally speaking, resource intensive applications that require monitoring of service usage.

Furthermore, the criterion related to corporate users may include an identifier of a Virtual Private Network where the user is connected to.

In accordance with a second aspect of the present invention, there is provided a policy decision server suitable for acting as, or for replacing, a PCRF of a PCC architecture, for providing network control of service data flows by making policy control decisions per user and service basis and by downloading corresponding policy control rules, such as PCC rules, towards a policy enforcement device; this policy enforcement device being suitable for acting as, or for replacing, a PCEF of a PCC architecture and in charge of handling and controlling resources in the bearer plane for a plurality of users.

This policy decision server includes: an input unit for receiving an indication from a policy enforcement device indicating the establishment of a session for a user through an IP Connectivity Access Network, namely an IP-CAN session; a generator for generating a user session for said user, and policy control rules applicable to said user session; an output unit for downloading towards the policy enforcement device the policy control rules applicable to said user session, and for indicating corresponding events to be reported; a processing unit for determining at least one criterion to monitor this user along with other users in a group of users, for associating the user session for the user with a group session for the at least one criterion, and for determining policy control rules applicable to said group session; and wherein the output unit is arranged for downloading towards the policy enforcement device the policy control rules applicable to said group session, and for indicating corresponding events to be reported.

In order to advantageously take actions at a group level as a response to certain events, thus aligned with the above method, the output unit of this policy decision server may be arranged for submitting towards the policy enforcement device, responsive to an event, an indication to either confirm, or modify, or terminate or replace the current policy control rules for the group session.

As for the above method, and for the embodiment where the policy enforcement device is in charge of creating the group session, the output unit of the policy decision server may be arranged for notifying the at least one criterion towards the policy enforcement device, and the input unit of the policy decision server may be arranged for receiving from the policy enforcement device an identifier of a session group for the at least one criterion. Also for this embodiment, the processing unit may cooperate with the generator at the policy decision server and, where the identifier of the session group identifies a new group session, the generator may be arranged for generating policy control rules applicable to the new group session.

Also as for the above method, and for the embodiment where the policy decision server is in charge of creating the group session, the generator of the policy decision server may further be arranged for generating a new group session for the at least one criterion, and for generating policy control rules applicable to the new group session.

Advantageous for both embodiments, the processing unit of the policy decision server may further be arranged for determining an already existing group session for the at least one criterion.

Moreover, aligned with the above method and with corresponding technical features, the processing unit of the policy decision server may further be arranged to handle criteria to monitor the user with the group of users, the criteria selected from: type of subscription, location area, service usage, corporate users, and combinations thereof.

In accordance with a third aspect of the present invention, there is provided a policy enforcement device suitable for acting as, or for replacing, a PCEF of a PCC architecture, for installing policy control rules, such as PCC rules, received from a policy decision server in order to handle and control resources in the bearer plane for a plurality of users; this policy decision server being suitable for acting as, or for replacing, a PCRF of a PCC architecture as stated above.

This policy enforcement device comprises: a first input unit cooperating with a processing unit for establishing a session for a user through an IP Connectivity Access Network, namely an IP-CAN session; an output unit for indicating towards a policy decision server the establishment of the IP-CAN session for the user; a second input unit arranged for downloading from the policy decision server first policy control rules applicable to the user session and second policy control rules applicable to a given group session, as well as indications of respective events to be reported; and wherein the processing unit is arranged for installing the first and second policy control rules, for associating the IP-CAN session with the group session, and for applying the second policy control rules applicable to the group session to all IP-CAN sessions associated with the group session. Optionally, said first and second input units may be provided as separate input units or as an integral input unit.

Aligned with the advantageous actions to be taken, as stated above, at a group level as a response to certain events, the output unit of the policy enforcement device may be arranged for reporting the respective events, upon detection by the processing unit.

For the sake of an additional flexibility to act on the policy control rules installed for the group session, the input unit of the policy enforcement device may be arranged for receiving an indication from the policy decision server to either confirm, or modify, or terminate or replace the current second policy control rules applicable for the group session.

Moreover, aligned with the above method, and for the embodiment where the policy enforcement device is in charge of creating the group session, the input unit of the policy enforcement device may be arranged for receiving a notification from the policy decision server indicating at least one criterion to monitor the user along with other users in a group of users, the processing unit of the policy enforcement device may be arranged for assigning a group session for the at least one criterion to monitor the user, and the output unit of the policy enforcement device may be arranged for submitting towards the policy decision server an identifier of the session group.

On the other hand, the invention may be practised by a computer program, in accordance with a fourth aspect of the invention, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which.

DETAILED DESCRIPTION

The following describes currently preferred embodiments of means and method of handling and controlling resources in the bearer plane for a plurality of users.

Figure 4:
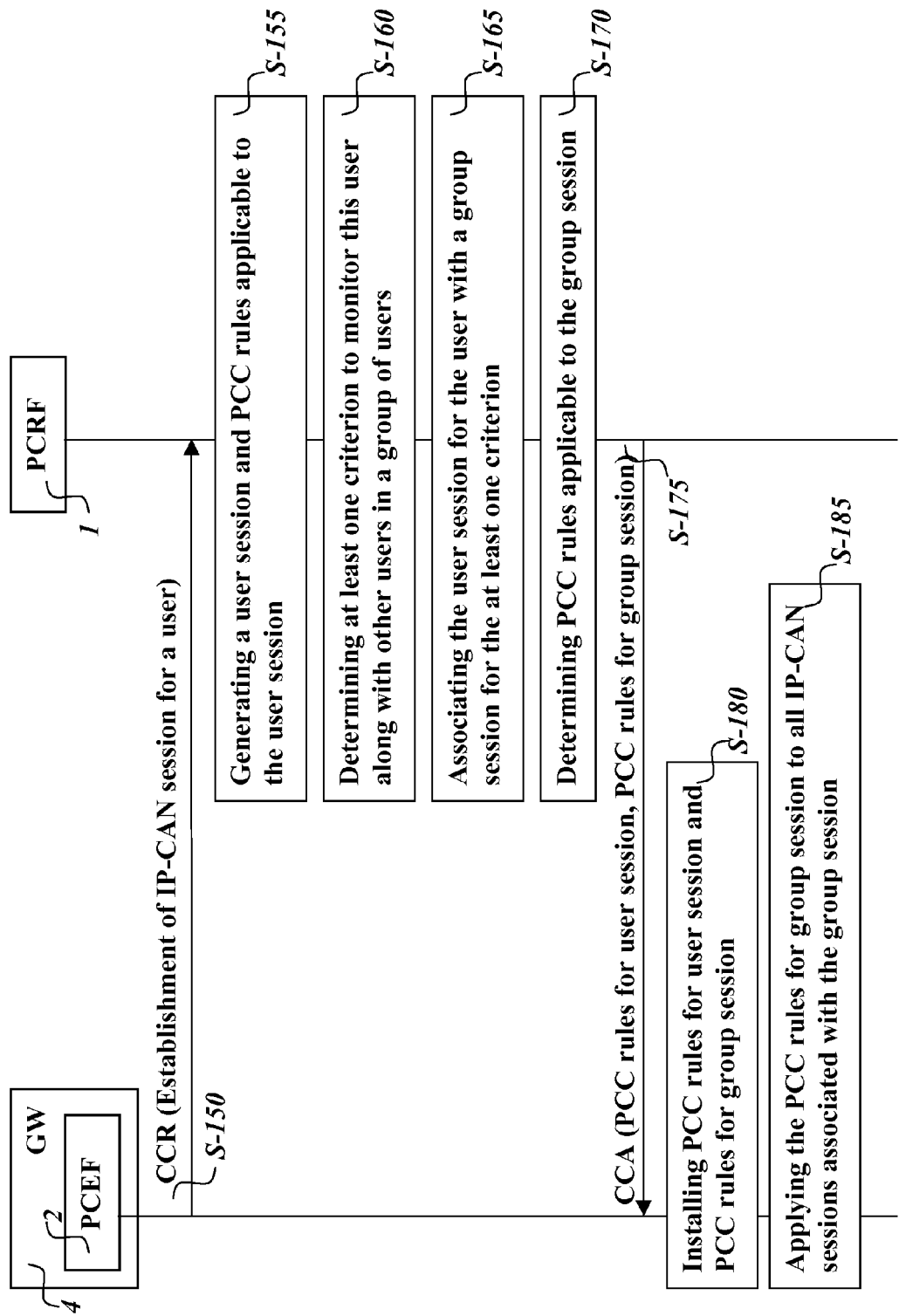
FIG. 4 illustrates a sequence of actions to be performed in accordance with the invention to carry out a method of handling and controlling resources in the bearer plane for a plurality of users.

In this respect, FIG. 4 illustrates relevant sequence of actions to carry out this method of handling and controlling resources in the bearer plane for a plurality of users in accordance with an embodiment of the invention.

The relevant sequence of actions illustrated in FIG. 4 start with a step S-150 of indicating from a PCEF 2 towards PCRF 1 the establishment of a session for a user through an IP Connectivity Access Network, namely an IP-CAN session.

Upon receipt of such indication, the PCRF 1 generates during a step S-155 a user session for the user and PCC rules to be applied at the bearer plane for IP flows corresponding to the user session; the PCRF 1 determines during a step S-160 at least one criterion to monitor this user along with other users in a group of users; the PCRF 1 associates during a step S-165 the user session for the user, which was generated during the step S-155, with a group session for the at least one criterion; and the PCRF 1 determines during a step S-170 PCC rules applicable to the group session.

In particular, the step of associating the user session for the user with the group session, under this embodiment, includes a step not illustrated in any drawing of determining whether an appropriate group session already exists for the at least one criterion. Where no group session exists for the at least one criterion, the step of associating the user session for the user with the group session also includes a step not illustrated in any drawing of generating a new group session at the PCRF 1 for the at least one criterion, and a step of generating PCC rules applicable to the new group session. On the other hand, where a group session already exists for the at least one criterion, the step of associating the user session for the user with the group session includes a step not illustrate din any drawing of determining at the PCRF 1 an already existing group session for the at least one criterion.

In the embodiment illustrated in FIG. 4, both PCC rules to be applied for the user session and PCC rules to be applied for the group session are downloaded together during a step S-175 towards the PCEF 2.

Upon receipt of said PCC rules, the PCEF 2 installs during a step S-180 the PCC rules for the user session and the PCC rules for the group session. Now, the PCEF can apply during a step S-185, and whilst these PCC rules for the group session are valid and in force, the PCC rules for the group session to all IP-CAN sessions associated with the group session.

Figure 3:
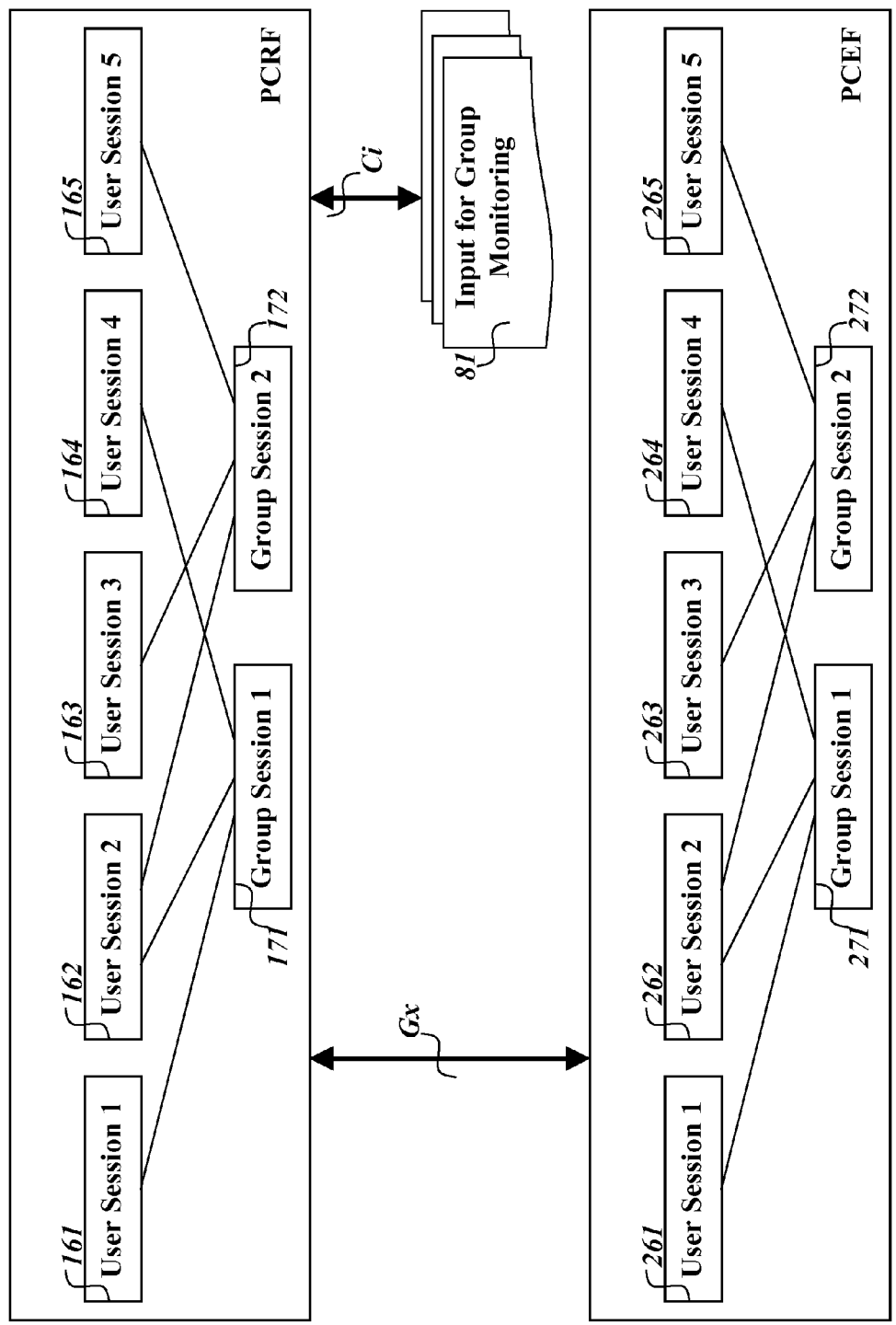
FIG. 3 shows an exemplary relationship of user session data and group session data in a PCRF and PCEF as well as interfaces involved between PCRF and input for group monitoring and between PCRF and PCEF.

Regarding the association of user sessions for users with group sessions at the PCRF 1, and the association of IP-CAN sessions for users with group sessions at the PCEF 2, an exemplary data model is illustrated in FIG. 3 wherein a same user session for a user can be applied with one or more group session and vice verse.

As shown in FIG. 3, where a number of user sessions 161-165 and another number of group sessions 171-172 at the PCRF are illustrated, a same user session 162 for a user may be associated with a couple of group sessions 171 and 172 at the PCRF 1. Likewise, FIG. 3 also illustrates a number of IP-CAN sessions 261-265 for users and another number of group sessions 271-272 at the PCEF 2, wherein a same IP-CAN session 262 for a user may be associated with a couple of group sessions 271 and 272 at the PCEF.

An alternative embodiment to the one illustrated in FIG. 4 is disclosed in the following with reference to FIG. 13A-14B. This alternative embodiment starts with a same step S-150 of indicating from a PCEF 2 towards PCRF 1 the establishment of an IP-CAN session for a user, a same step S-155 of generating at the PCRF 1 a user session for the user and PCC rules to be applied at the bearer plane, and a same step S-160 of determining at the PCRF the at least one criterion to monitor this user along with other users in a group of users.

Figure 13A:
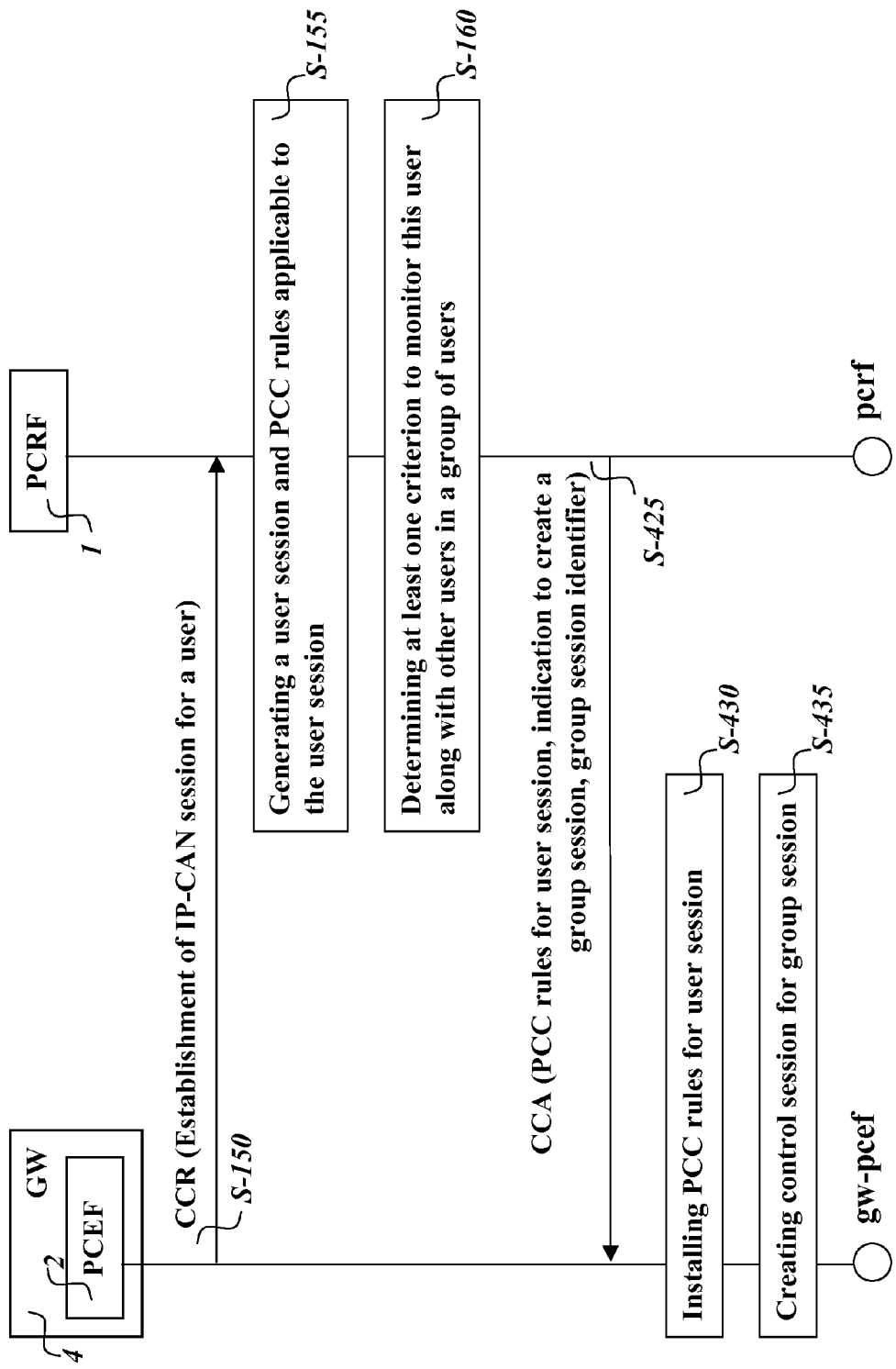
FIG. 13A-13B illustrate a sequence of actions to be performed in accordance with an embodiment of the invention to carry out the method of handling and controlling resources in the bearer plane for a plurality of users.

In this alternative embodiment depicted in FIG. 13A, instead of generating the group session at the PCRF 1, the PCRF 1 downloads during a step S-425 the PCC rules for the user session along with an indication to create a group session for the at least one criterion towards the PCEF 2.

The PCEF receiving the PCC rules for the user session installs during a step S-430 such PCC rules for the user session and, aware of the indication to create a group session, either generates a group session during a step S-435, or determines an existing group session to be applied. Moreover, the PCEF 2 establishes a control session for the group session.

Figure 13B:
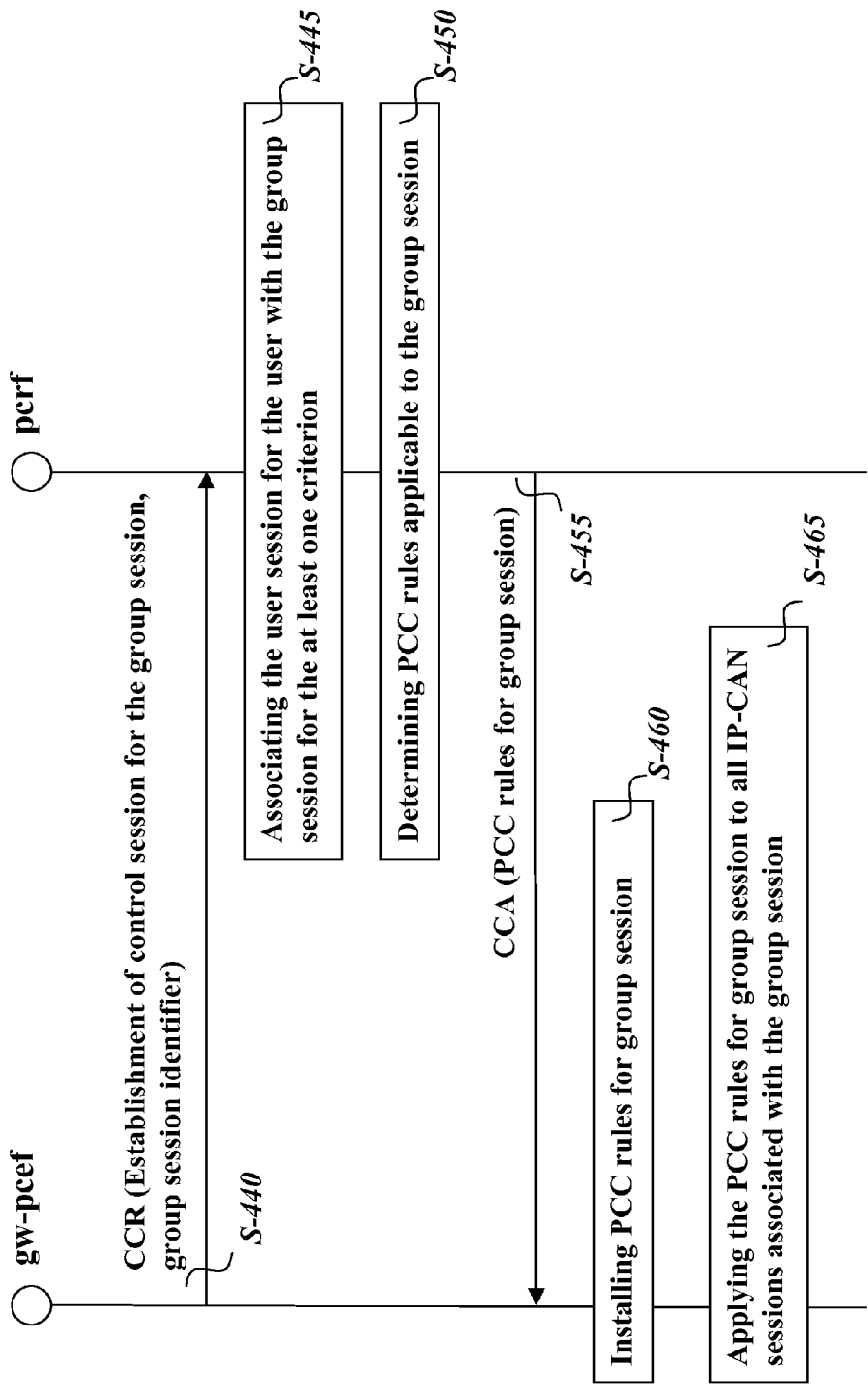

Then, as illustrated in FIG. 13B, the PCEF 2 indicates during a step S-440 the establishment of the control session for the group session, and provides an identifier of said group session, towards the PCRF 1.

Upon receipt of the indication of establishment of the control session for the group session, the PCRF 1 associates during a step S-445 the user session for the user therein with the group session indicated from the PCEF 2 for the at least one criterion. The PCRF 1 also determines during a step S-450 PCC rules applicable to the group session, either by generating PCC rules applicable to a new group session received from the PCEF 2, or by determining existing PCC rules applicable to an existing group session indicated from the PCEF 2.

Subsequently under this embodiment, the PCRF 1 downloads during a step S-455 the PCC rules for the group session towards the PCEF 2, and the PCEF 2 installs the received PCC rules for the group session during a step S-460.

As for the previous embodiment, the PCEF can apply during a step S-465, and whilst these PCC rules for the group session are valid and in force, the PCC rules for the group session to all IP-CAN sessions associated with the group session.

As already commented above, an in order to carry out the above method steps, the present invention provides for a policy decision server suitable for acting as, or for replacing, a PCRF of a PCC architecture for providing network control of service data flows, by making policy control decisions per user and service basis and by downloading corresponding policy control rules, such as PCC rules, towards a policy enforcement device.

Figure 6:
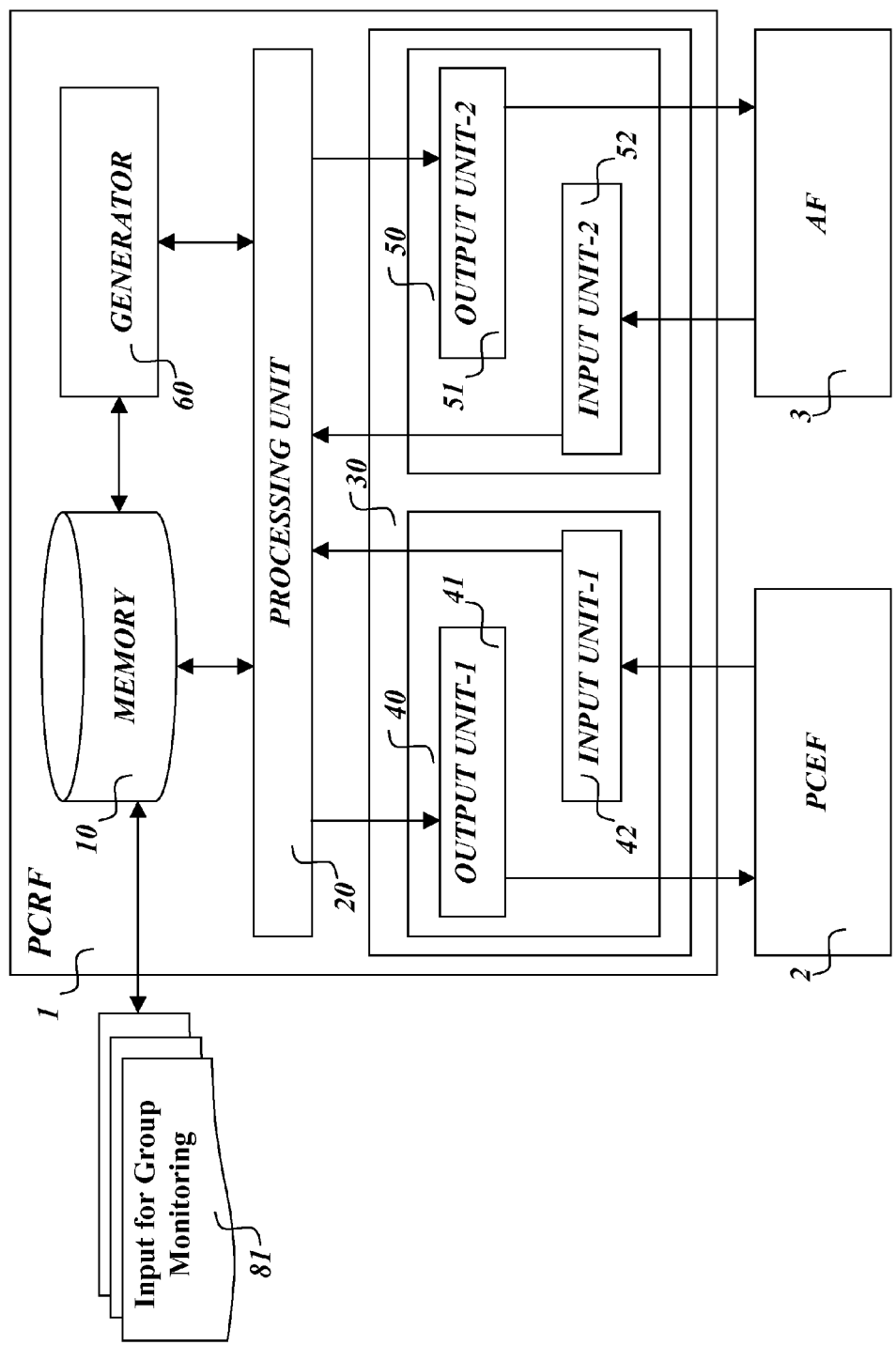
FIG. 6 illustrates an exemplary implementation of a policy decision server suitable for acting as, or for replacing, a PCRF of a PCC architecture, for providing network control of service data flows by making policy control decisions per user and service basis and by downloading corresponding policy control rules, such as PCC rules, towards a policy enforcement device.

In this respect, FIG. 6 illustrates an exemplary implementation of a PCRF 1 implementing the features included in a policy decision server in accordance with the second aspect of the invention.

FIG. 6 thus shows a PCRF 1 including an input unit 42 for receiving an indication from a PCEF 2, which in particular may be a device implemented in a Gateway 4, indicating the establishment of an IP-CAN session for a given user; a generator 60 for generating a user session for said user, and for generating policy control rules applicable to said user session; and an output unit 41 for downloading towards the PCEF 2 the policy control rules applicable to said user session, and for indicating corresponding events to be reported.

More specifically, the input unit 42 and the output unit 41 are connected with the generator 60 via a processing unit 20 in charge of controlling when the former units enter into operation as well as the required data to be exchanged between them.

Figure 9:
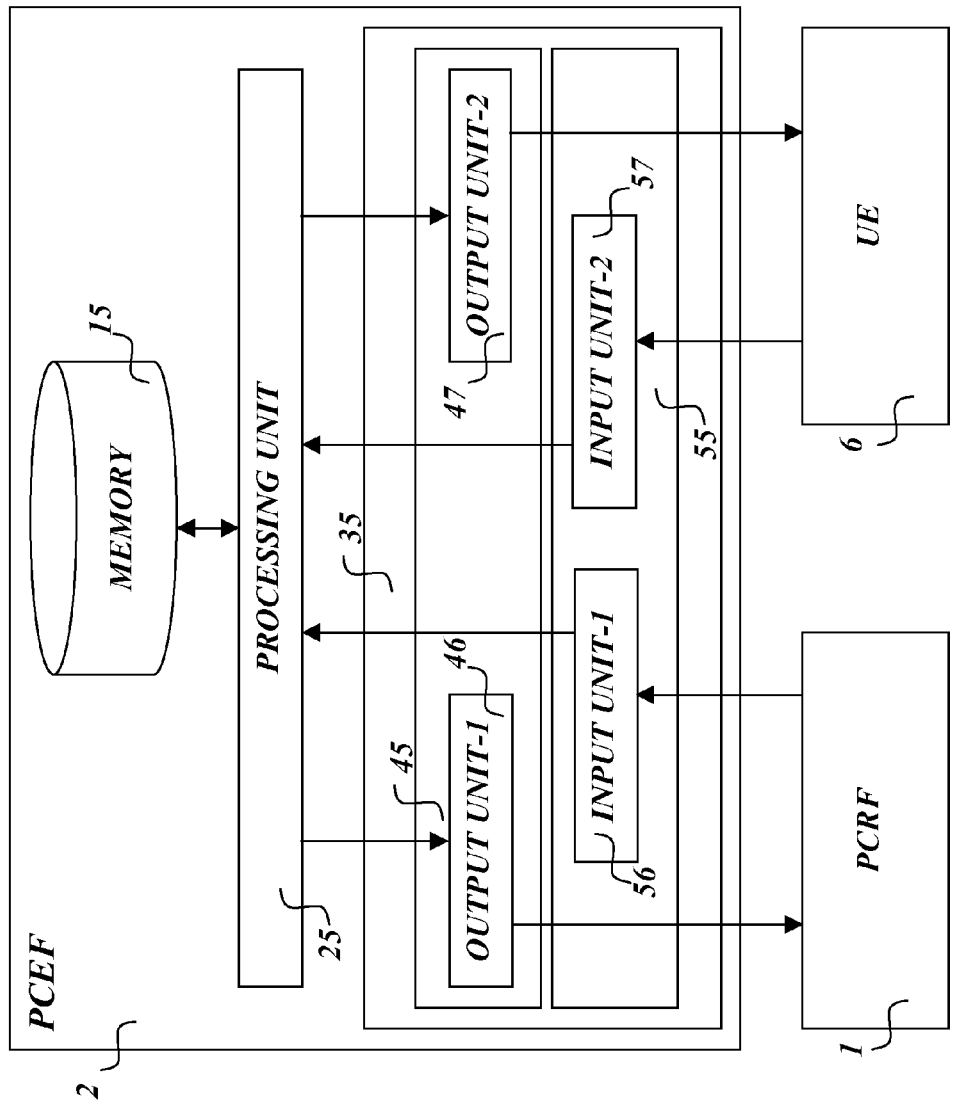
FIG. 9 illustrates an exemplary implementation of a policy enforcement device suitable for acting as, or for replacing, a PCEF of a PCC architecture, for installing policy control rules, such as PCC rules, received from a policy decision server in order to handle and control resources in the bearer plane for a plurality of users.

In particular, the input unit 42 and the output unit 41 may be provided as an integral input/out unit 40 as illustrated in FIG. 6 though other arrangements are also possible as the one illustrated in FIG. 9 and further commented.

Apart from controlling the operation of the input unit 42, the output unit 41 and the generator 60, the processing unit 20 of the PCRF 1 illustrated in FIG. 6 is also arranged for determining at least one criterion to monitor this user along with other users in a group of users, for associating the user session 162 for the user with a group session 172 for the at least one criterion, and for determining policy control rules applicable to said group session.

Figure 1:
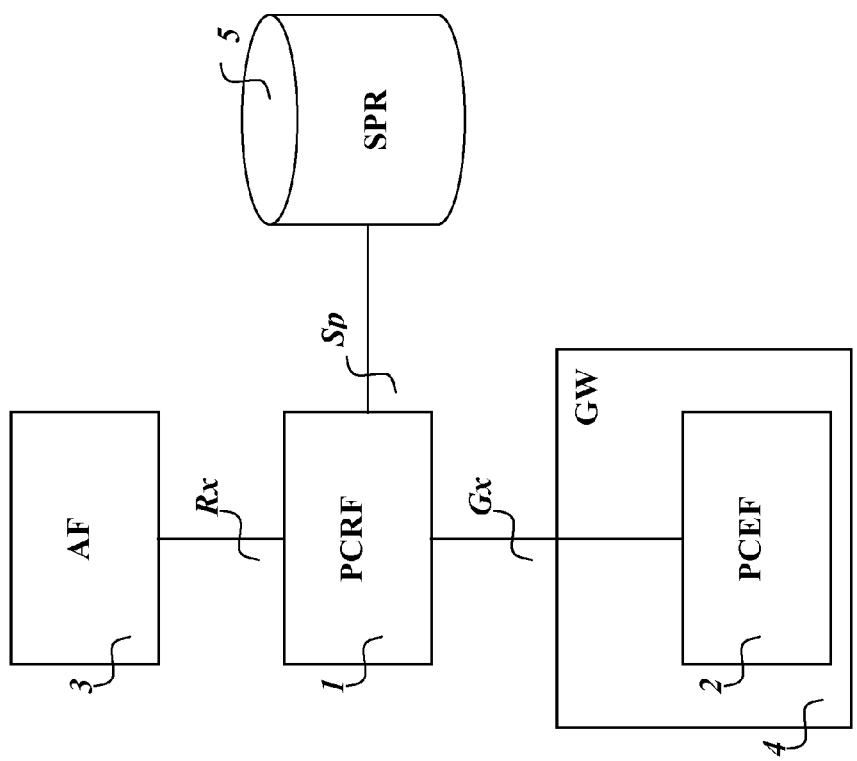
FIG. 1 basically represents a conventional model of entities involved in PCC architecture.
Figure 2:
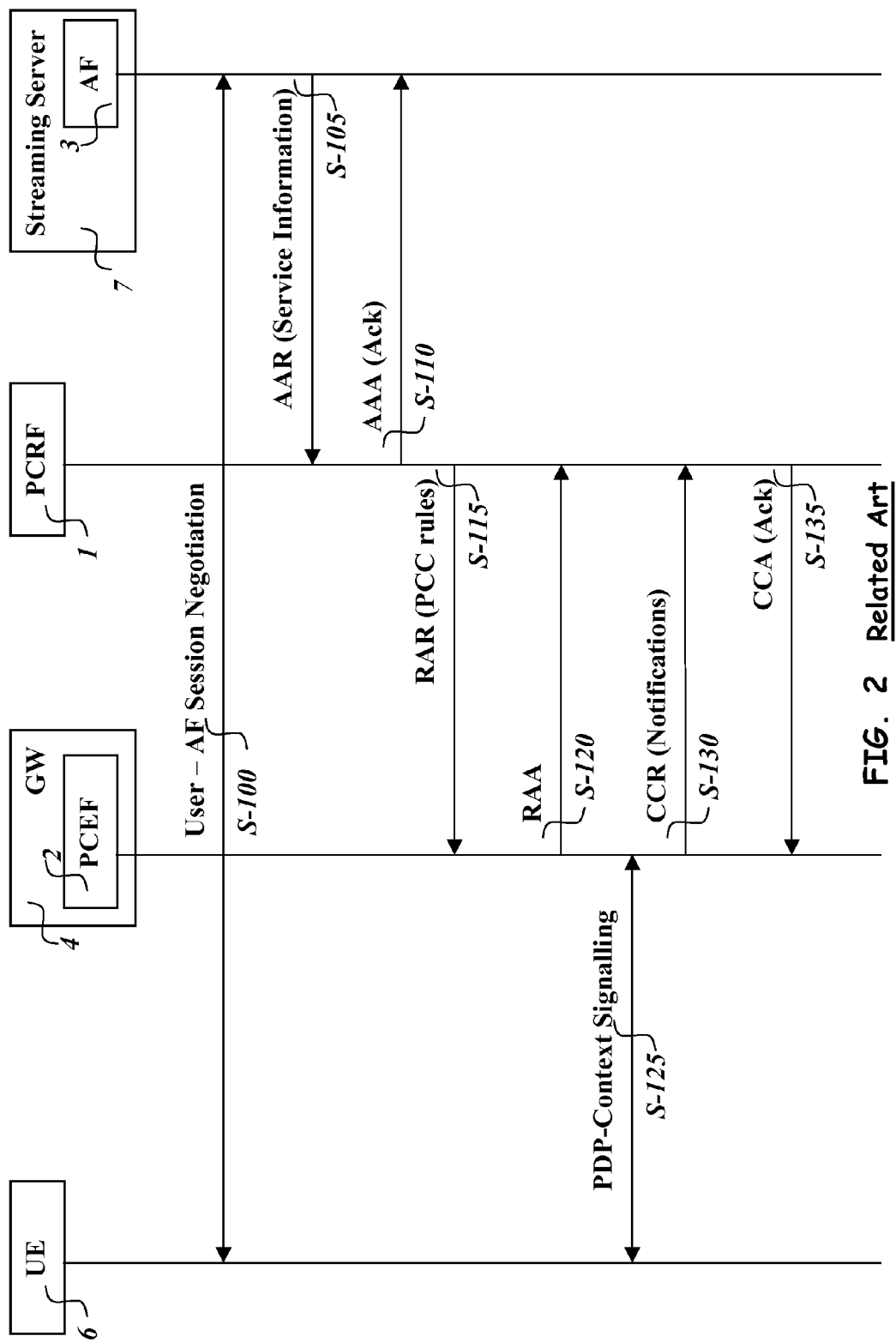
FIG. 2 shows a conventional sequence of actions carried out where a user with user equipment exemplary accesses a streaming server in a scenario with PCC architecture.

To this end, the processing unit 20 cooperates with a storage 10 to store criteria to monitor users, the criteria received as an input for group monitoring 81 preferably from a so-called Provisioning System 8 in charge of configuring said criteria and likely other user data to be provisioned into the Subscriber Profile Repository 5 illustrated in FIG. 1. In particular, this Subscriber Profile Repository 5 may be implemented as external data storage, or being an integral part of the storage 10 included in the PCRF shown in FIG. 6. In particular, the storage 10 is connectable with the generator 60 and with the processing unit 20 directly or through each other.

In order to accomplish method steps in accordance with an embodiment above, namely where the group session is created in the policy enforcement device of the gateway 4, the output unit 41 may be arranged for notifying the at least one criterion towards the PCEF 2, and the input unit 42 may be arranged for receiving from the PCEF 2 an identifier of a session group, which may be generated therein, for the at least one criterion. Under this embodiment, the processing unit 20 may also cooperate with the generator 60 and, where the identifier of the session group identifies a new group session, the generator may be arranged for generating policy control rules, such as PCC rules, applicable to the new group session.

In order to accomplish method steps in accordance with another embodiment of the invention explained above, that is, where the group session is created at the policy decision server, the generator 60 may be further arranged for generating a new group session 172 for the at least one criterion, and for generating policy control rules applicable to said new group session.

Nevertheless, an irrespective of the preferred embodiment, the processing unit 20 of the PCRF illustrated in FIG. 6 may be further arranged for determining an already existing group session 172 for the at least one criterion.

Furthermore, as already commented above, the processing unit 20 is arranged to handle criteria to monitor the user with the group of users, amongst others, those selected from: type of subscription, location area, service usage, corporate users, and combinations thereof.

Still further, in order to accomplish the above method steps, as illustrated in FIG. 4 and FIG. 13A-13B, the output unit 41 of the PCRF 1 shown in FIG. 6 is arranged for downloading towards the PCEF 2 the policy control rules applicable to said group session, and for indicating corresponding events to be reported.

In particular, the association between user sessions 161-165 and group sessions 171-172 in the PCRF 1, as well as policy control rules for the user session and policy control rules for the group session, may be stored in the storage 10 accessible to the processing unit 20. Moreover, indications about the events to be reported and other related data may be stored in the storage 10 as well.

As also commented above, an in order to carry out the above method steps, the present invention provides for a policy enforcement device suitable for acting as, or for replacing, a PCEF of a PCC architecture for installing policy control rules, such as PCC rules, received from a policy decision server 1 in order to handle and control resources in the bearer plane for a plurality of users.

In this respect, FIG. 9 illustrates an exemplary implementation of a PCEF 2 implementing the features included in a policy enforcement device in accordance with the third aspect of the invention.

FIG. 9 thus shows a PCEF 2 including an input unit 57 cooperating with a processing unit 25 for establishing an IP-CAN session 262 for a user 6; an output unit 46 for indicating towards a PCRF 1, as the one illustrated in FIG. 6, the establishment of the IP-CAN session for the user 6; another input unit 56 arranged for downloading from the PCRF 1 first policy control rules applicable to the user session 262, namely for the IP-CAN session, and second policy control rules applicable to a given group session 272, as well as indications of respective events to be reported.

The processing unit 25 of this PCEF 2 illustrated in FIG. 9 is also arranged for installing the first and second policy control rules, for associating the IP-CAN session 262 with the group session 272, and for applying the second policy control rules applicable to the group session 272 to all IP-CAN sessions associated with the group session.

In particular, the association between IP-CAN sessions and group sessions may be carried out in storage 15 accessible to the processing unit 25. Moreover, first and second policy control rules, such as PCC rules, may also be stored in the storage 15.

Also in particular, the input unit 57 and the input unit 56 may be provided as an integral input unit 55 as illustrated in FIG. 9 though other arrangements are also possible as the one illustrated in FIG. 6. On the other hand, the output unit 46 for communication with the PCRF 1 may be provided as in integral output unit 45 including an output unit 47 for communication with the user equipment in use by the user 6. Where other arrangements are preferred, such as the one in FIG. 6, the present invention may be carried out by providing a first input/output unit, including the output unit 46 and the input unit 56, for communication between the PCRF and the PCEF, such as the unit 40 shown in FIG. 6; whereas a second input/output unit, including the output unit 47 and the input unit 57, may be provided at the PCEF for communication between the PCEF and the user equipment in use by the user 6.

In order to accomplish method steps in accordance with an embodiment above, namely where the group session is created in the policy enforcement device of the gateway 4, the input unit 56 may be arranged for receiving a notification from the PCRF 1 indicating at least one criterion to monitor the user 6 along with other users in a group of users, the processing unit 25 may be arranged for assigning a group session for the at least one criterion to monitor the user, and the output unit 46 is arranged for submitting towards the PCRF 1 an identifier of the session group.

As already commented above, this method is advantageous to take actions at a group level as a response to certain events. In this respect, events to be responded may be any event selected from: events triggered from the policy enforcement device; internal events detected at the policy decision server;

and events notified to the policy decision server from an external entity such as a provisioning system, an AF device, or both.

Figure 5:
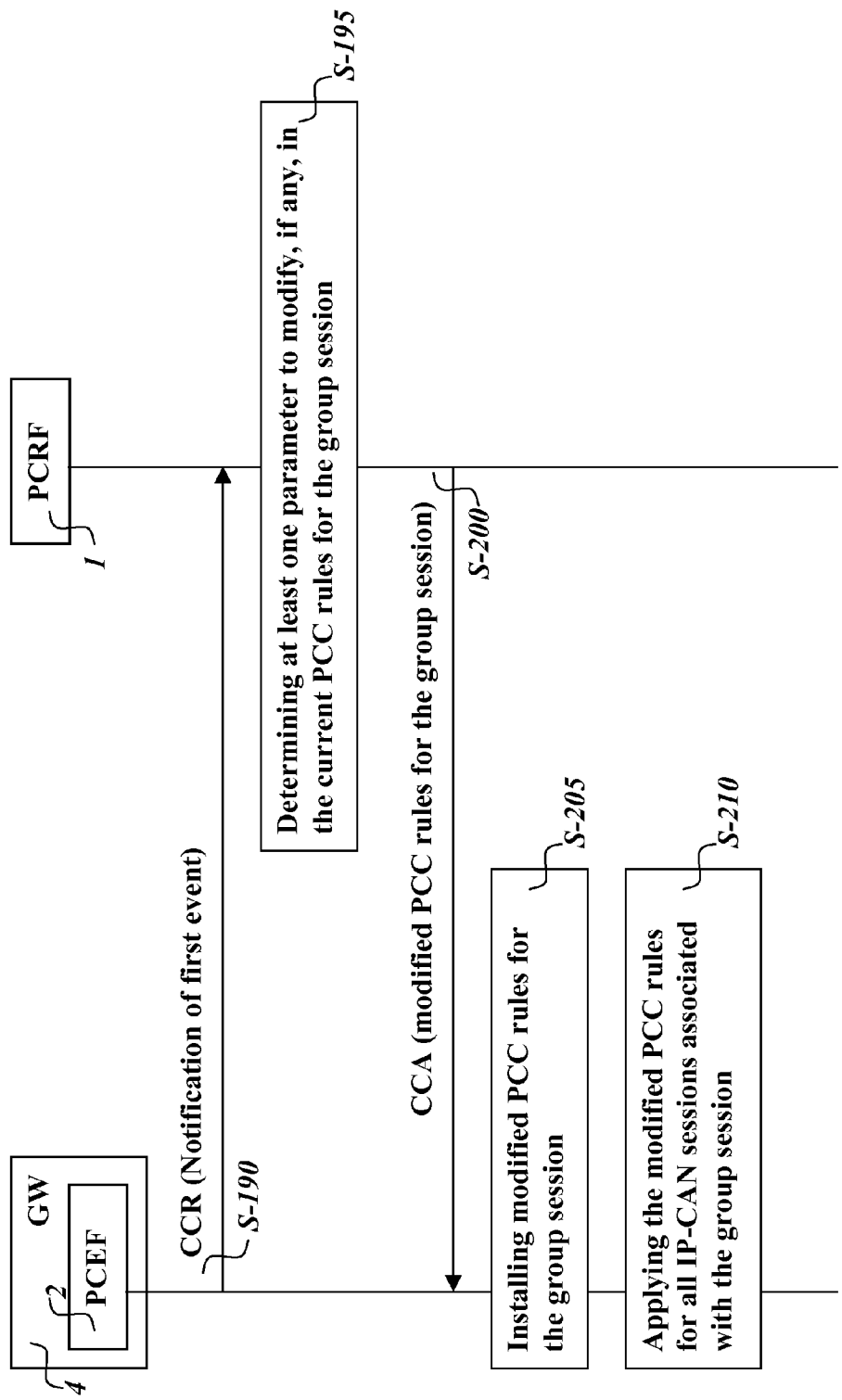
FIG. 5 illustrates a first sequence of actions to be performed on a group basis upon notification of an exemplary first event from the PCEF towards the PCRF.

FIG. 5 illustrates a sequence of actions carried out in this method upon detection of an exemplary first event at the PCEF 2, which is regarded as a policy enforcement device throughout the present specification.

As illustrated in FIG. 5, upon detection of such event at the PCEF 2, and assuming this event has been indicated from the PCRF 1 to be reported, the PCEF notifies the occurrence to the PCRF 1 during a step S-190.

The PCRF 1 receiving such notification may determine during a step S-195 at least one parameter to modify in the currently applicable policy control rules for the group session, and downloads during a step S-200 the modified policy control rules for the group session towards the PCEF 2.

The PCEF 2 installs during a step S-205 the modified policy control rules for the group session as received from the PCRF 1, and the PCEF can apply during a step S-210, and whilst these policy control rules for the group session are valid and in force, the policy control rules for the group session to all IP-CAN sessions associated with the group session.

Nevertheless, where the determination carried out during the step S-195 does not result in any parameter to be modified, the answer carried out during the step S-200 simply indicates a confirmation of the currently applicable and already installed policy control rules for the group session.

Figure 7:
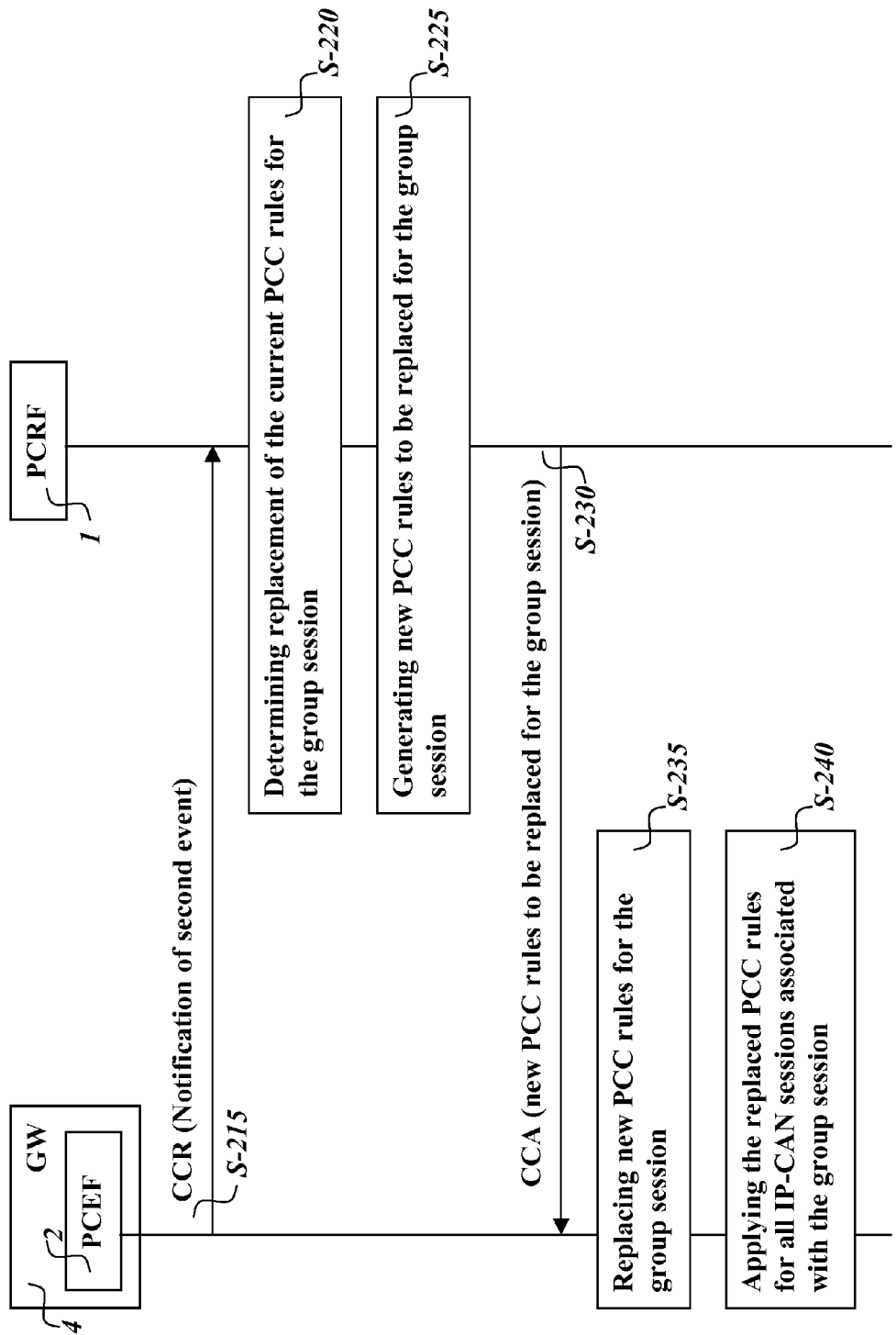
FIG. 7 illustrates a second sequence of actions to be performed on a group basis upon notification of an exemplary second event from the PCEF towards the PCRF.

FIG. 7 illustrates a sequence of actions carried out in this method upon detection of an exemplary second event at the policy enforcement device, namely at the PCEF 2.

As illustrated in FIG. 7, upon detection of such event at the PCEF 2, and assuming this second event has also been indicated from the PCRF 1 to be reported, the PCEF notifies the occurrence to the PCRF 1 during a step S-215.

The PCRF 1 receiving such notification may determine during a step S-220 that a replacement of currently applicable policy control rules for the group session is necessary, generates during a step S-225 new policy control rules to be replaced at the PCEF for the group session, and downloads during a step S-230 the new policy control rules to be replaced for the group session towards the PCEF 2.

The PCEF 2 installs during a step S-235 the new policy control rules for the group session as received from the PCRF 1, and the PCEF can apply, during a step S-240, and whilst these new policy control rules for the group session are valid and in force, the new policy control rules for the group session to all IP-CAN sessions associated with the group session.

As for the above treatment of the exemplary first report illustrated in FIG. 5, where the determination carried out during the step S-220 does not result in a replacement of policy control rules, the answer carried out during the step S-230 simply indicates a confirmation of the currently applicable and already installed policy control rules for the group session.

Figure 8:
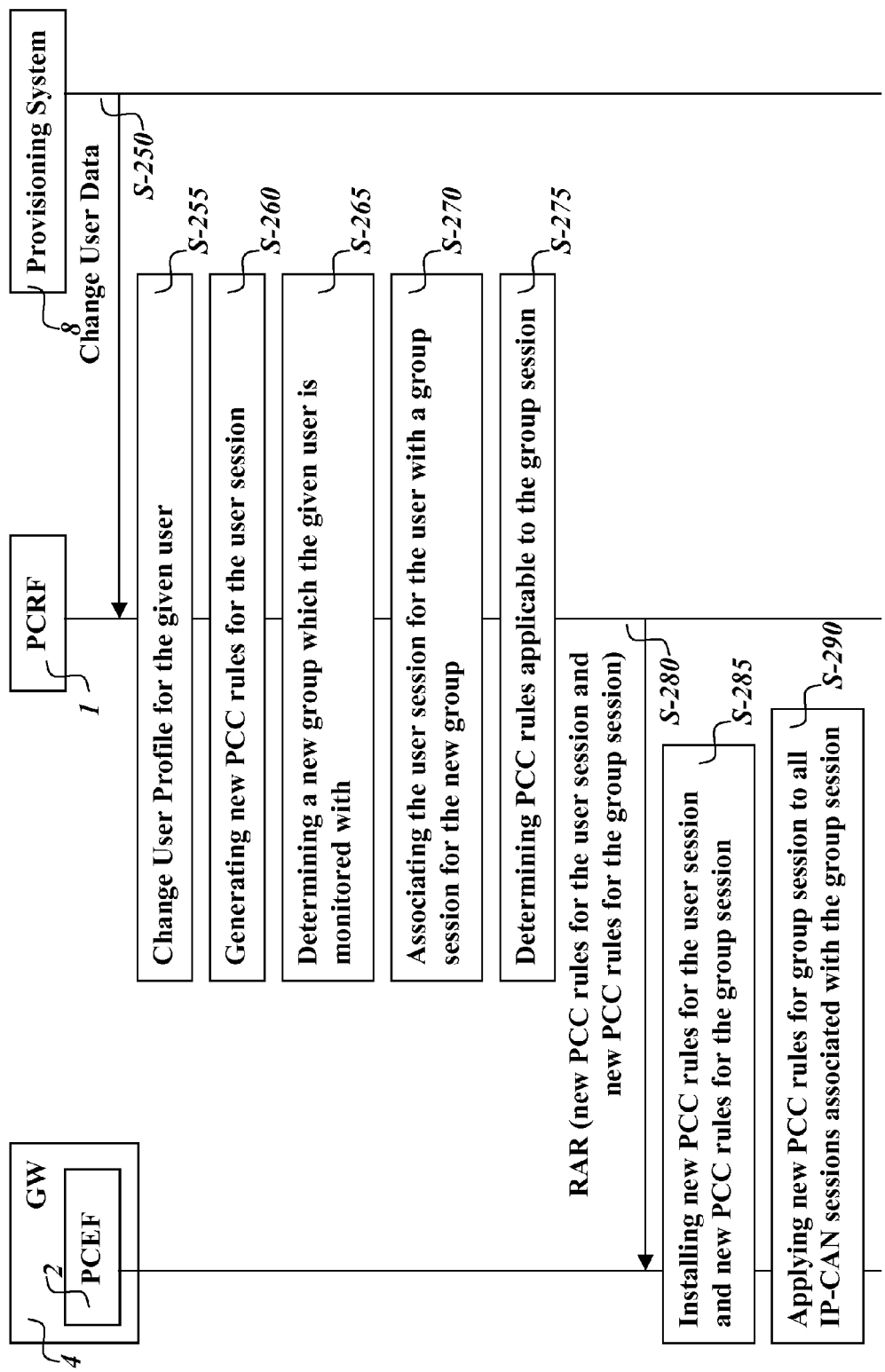
FIG. 8 illustrates a third sequence of actions to be performed on a group basis upon notification of an exemplary third event from a provisioning system towards the PCRF.

FIG. 8 illustrates a sequence of actions carried out in this method upon detection of an exemplary event at a provisioning system 8, such as a change of user data.

As illustrated in FIG. 8, upon a change of user data notification received during a step S-250 at the PCRF 1 from a provisioning system 8, the PCRF changes the user profile for the given user in accordance with notification data during a step S-255.

Then, the PCRF 1 generates during a step S-260 new policy control rules applicable to the user session, determines during a step S-265 a new group which the user is to be monitored with, associates during a step S-270 the user session for the user with a group session for the new group of users, determines during a step S-275 those policy control rules applicable for the group session, and downloads during a step S-280 the new policy control rules applicable for the user and the new control rules applicable for the group session towards the PCEF 2.

The PCEF 2 installs during a step S-285 the new control rules for the user session and the new policy control rules for the group session as received from the PCRF 1, and the PCEF can apply, during a step S-290, and whilst these new policy control rules for the user session and new policy control rules for the group session are valid and in force, the new policy control rules for the group session to all IP-CAN sessions associated with the group session.

Aligned with the above treatments of the exemplary first and second reports illustrated in FIG. 5 and FIG. 7, where the determination carried out during the step S-265 does not result in a new group, the new user session is associated with the previously assigned group and there is no need for a replacement of policy control rules. The answer carried out during the step S-280 downloads the new policy control rules applicable for the user and thus indicates a confirmation of the currently applicable and already installed policy control rules for the group session.

Figure 11:
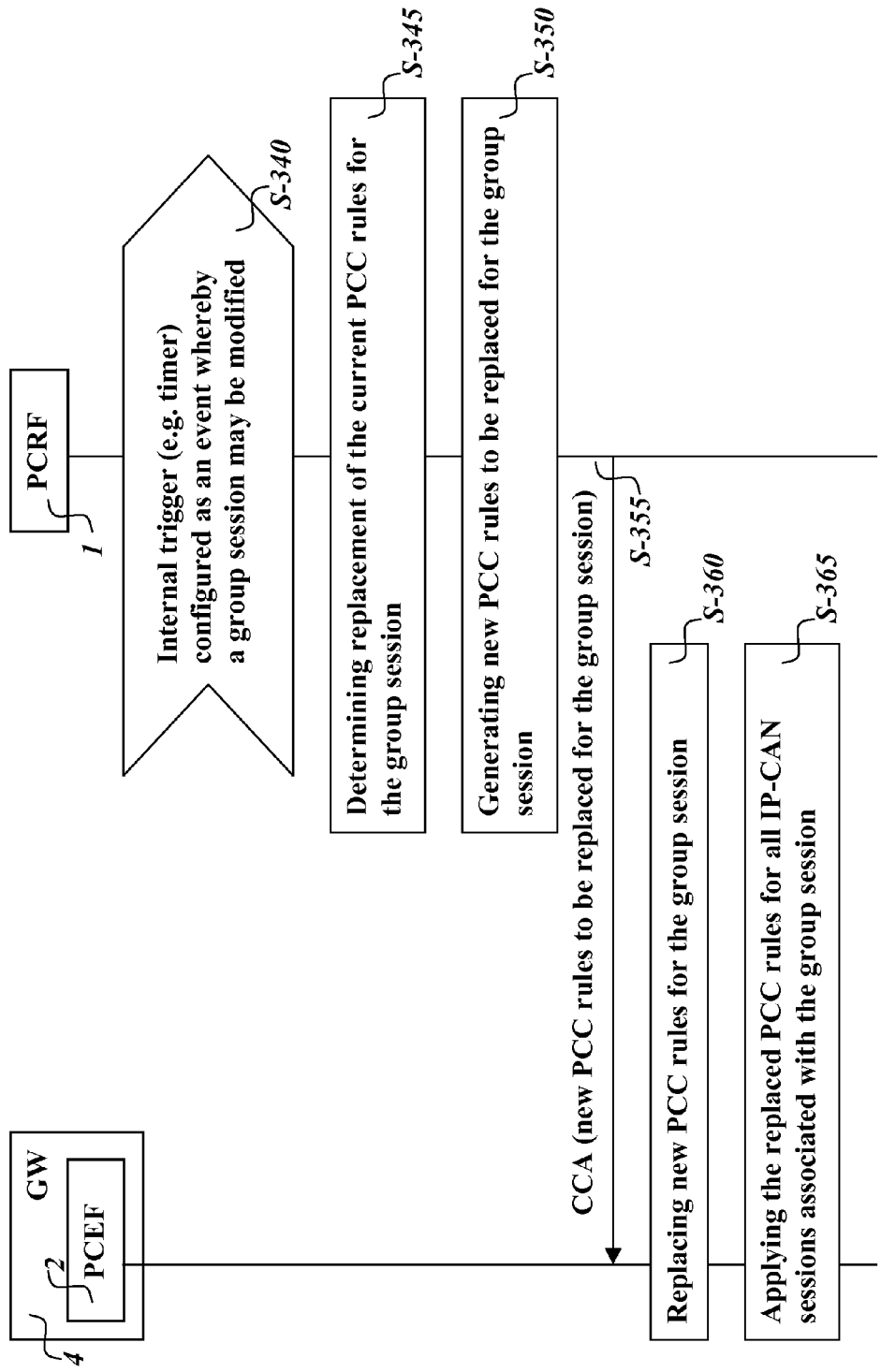
FIG. 11 illustrates a fifth sequence of actions to be performed on a group basis upon detection of an exemplary fifth event internally at the PCRF.

FIG. 11 illustrates a sequence of actions carried out in this method upon detection of an exemplary event internally at the policy decision server 1, which as commented above may be acting as, or replacing, a PCRF of a PCC architecture.

As illustrated in FIG. 11, upon detection during a step S-340 of an internal trigger configured as an event whereby a group session may be modified, such as expiry of a timer, the PCRF 1 may determine during a step S-345 a necessary replacement of the policy control rules currently applicable for the group session.

Then, the PCRF 1 may generate during a step S-350 new policy control rules applicable for the group session, and may download during a step S-355 said new policy control rules to replace the currently applicable ones for the group session.

The PCEF 2 installs during a step S-360 the new policy control rules for the group session as received from the PCRF 1, and the PCEF can apply, during a step S-365 and whilst these new policy control rules for the group session are valid and in force, the new policy control rules for the group session to all IP-CAN sessions associated with the group session.

In a similar manner as for the exemplary first report illustrated in FIG. 5, where the determination carried out during the step S-345 does not result in a replacement of policy control rules, the answer carried out during the step S-355 simply indicates a confirmation of the currently applicable and already installed policy control rules for the group session.

Figure 12:
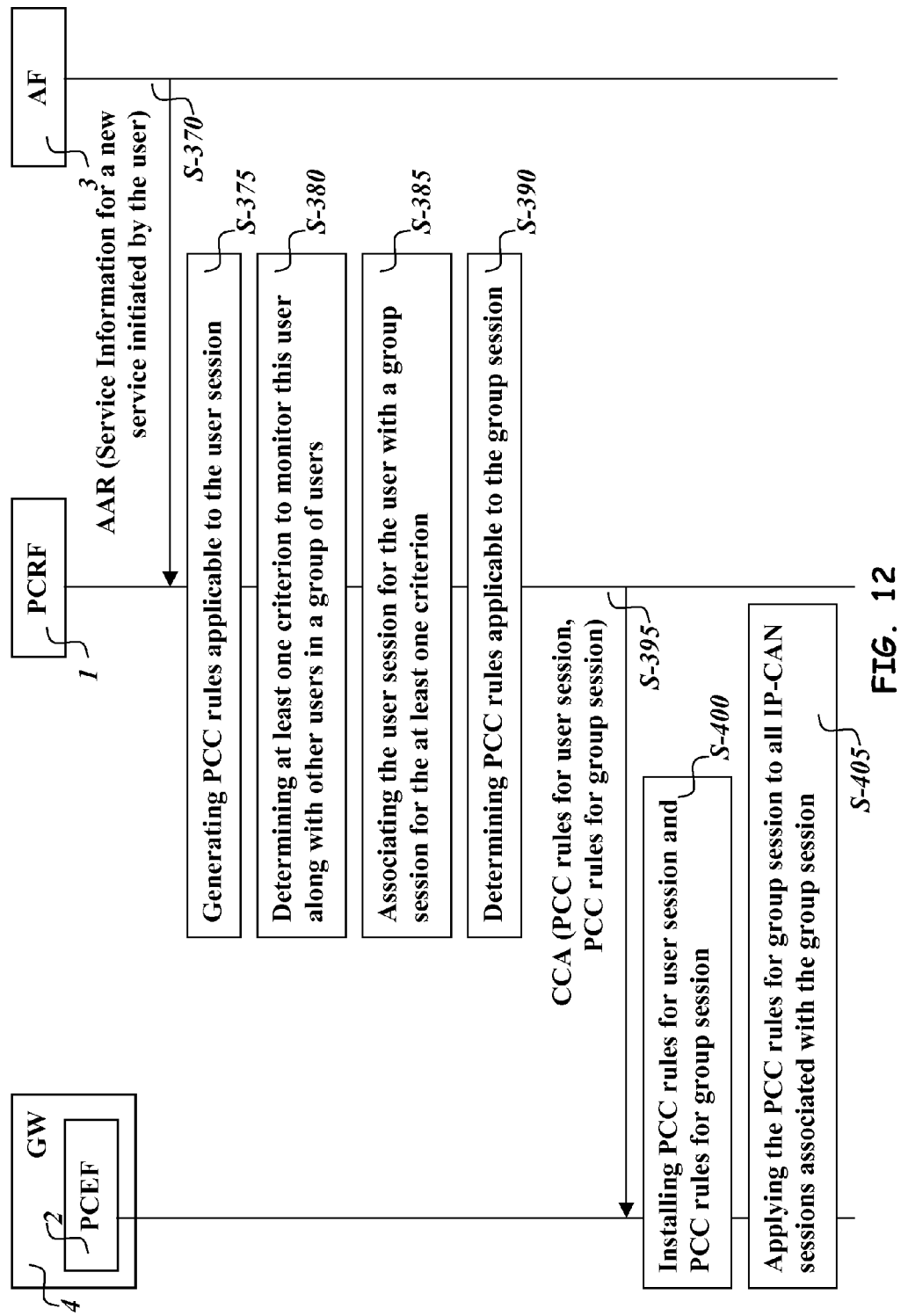
FIG. 12 illustrates a sixth sequence of actions to be performed on a group basis upon notification of an exemplary sixth event from an AF device towards the PCRF.

FIG. 12 illustrates a sequence of actions carried out in this method upon detection of an exemplary event at an AF device 3 operating in accordance with a PCC architecture for the purpose of the present invention, such as a new service initiated by the user 6.

As illustrated in FIG. 12, upon notification received during a step S-370 at the PCRF 1 from the AF 3 of a new service initiated by the user, the PCRF may generate during a step S-375 policy control rules applicable to the user session. In addition, the PCRF may determine during a step S-380 at least one criterion to monitor this user along with other users in a group of users, and thus assign during a step S-385 the user session for the user with a group session for the at least one criterion. In such a case, the PCRF may also determine during a step S-390 policy control rules applicable to the group session, and may download during a step S-395 the policy control rules applicable to the user session and the policy control rules for the group session.

The PCEF 2 installs during a step S-400 the policy control rules for the user session and the policy control rules for the group session as received from the PCRF 1, and then the PCEF can apply, during a step S-405, and whilst these policy control rules for the group session are valid and in force, the policy control rules for the group session to all IP-CAN sessions associated with the group session.

Apart from the exemplary events detected at, or reported to, the PCRF 1 and which may lead to either confirm, or modify, or replace the currently applicable policy control rules for the group session towards the PCEF 2, there may be other events triggering the termination of the group session.

Figure 10:
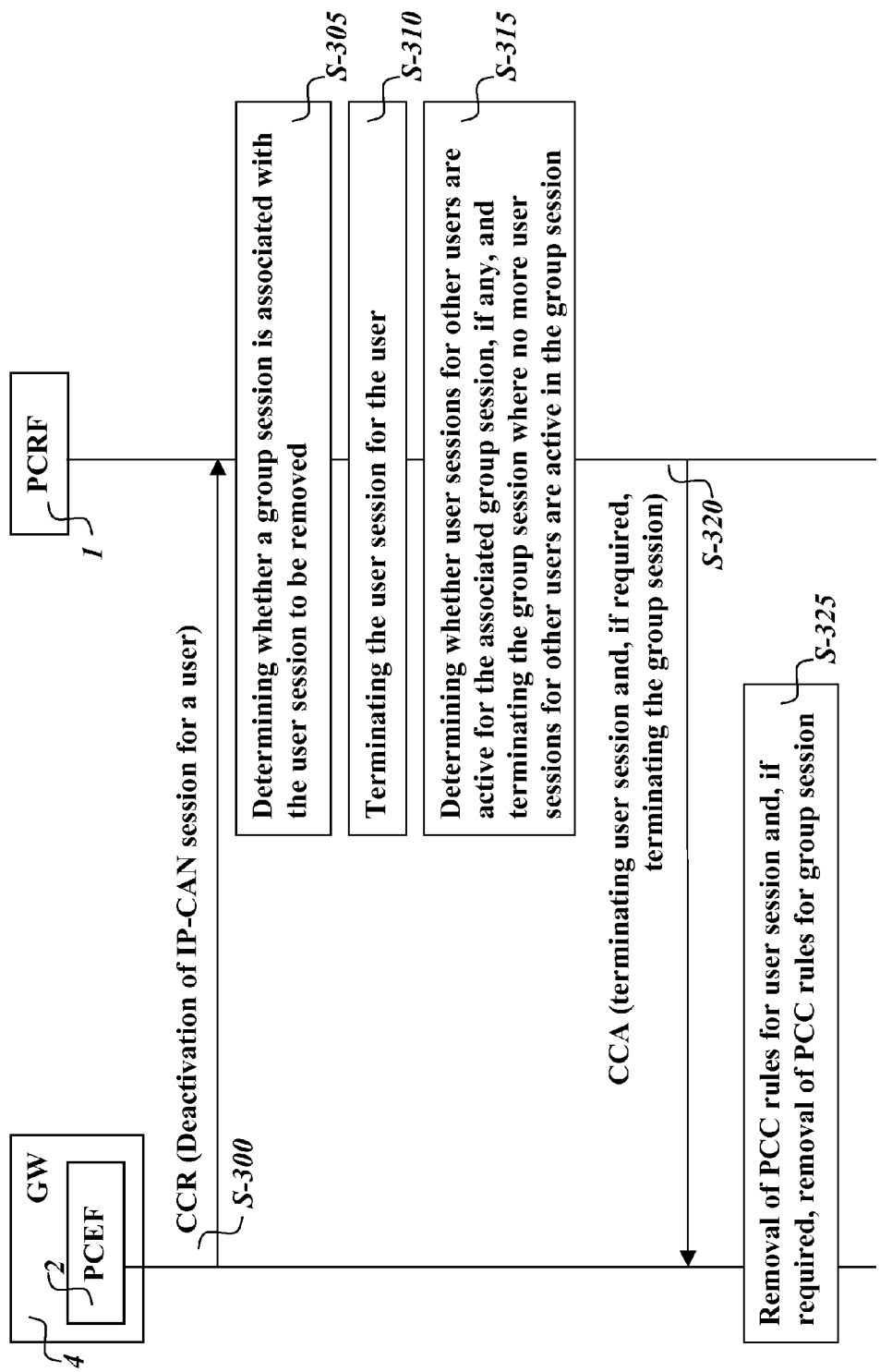
FIG. 10 illustrates a fourth sequence of actions to be performed on a group basis upon notification of an exemplary fourth event, in this case a deactivation of the IP-CAN session for the user, from the PCEF towards the PCRF.

FIG. 10 illustrates a sequence of actions carried out in this method upon notification during a step S-300 from the PCEF 2 towards the PCRF 1 of an exemplary event such as the deactivation of the IP-CAN session for the user.

Upon receipt of such notification, the PCRF 1 may determine during a step S-305 whether a group session is associated with the user session to be terminated. Then, apart from terminating the user session for the user during a step S-310, the PCRF determines during a step S-315 whether user sessions for other users are still active for said group session and, where no more user sessions for other users are active for said group session, the PCRF may terminate said group session.

Eventually, the PCRF 1 submits during a step S-320 an indication to terminate the user session for the user and, where no more user sessions for other users are active for said group session, an indication to also terminate the group session.

Upon receipt of such indication, the PCEF 2 removes during a step S-325 the policy control rules for the user session and, where the termination of the group session is also indicated, the PCEF also removes the policy control rules for the group session during this or a further step.

In order to carry out the above steps of this method for handling the notification of events and for carrying out corresponding actions, the policy decision server acting as, or replacing, a PCRF of a PCC architecture may be further arranged, as illustrated in FIG. 6, so that the input unit is arranged for receiving an event selected from a group of events including: events triggered from the policy enforcement device 2; internal events detected at the policy decision server 1; and events notified to the policy decision server 1 from an external entity selected from a provisioning system 8, an Application Function device "AF" 3, and both; and the output unit 41 is arranged for submitting towards the policy enforcement device 2, responsive to any such event, an indication to either confirm, or modify, or terminate or replace the current policy control rules for the group session.

Aligned with the behaviour of the policy decision server, and in order to carry out the above steps of this method for handling the notification of events and for carrying out corresponding actions, the policy enforcement device acting as, or replacing, a PCEF of a PCC architecture may be further arranged, as illustrated in FIG. 9, so that the output unit 46 is arranged for reporting, upon detection by the processing unit 25, the respective events.

Moreover, the input unit 56 of the policy enforcement device 2 may be arranged for receiving an indication from the policy decision server 1 to either confirm, or modify, or terminate, or replace the current second policy control rules applicable for the group session.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of handling and controlling resources in the bearer plane for a plurality of users, the method comprising the steps of:

indicating from a policy enforcement device (PCEF) towards a policy decision server (PCRF) the establishment of a session for a user through an IP Connectivity Access Network (IP-CAN session);

generating at the policy decision server a user session for said user, and first policy control rules applicable for said user session;

determining, at the policy decision server, at least one criterion to monitor this user along with other users in a group of users;

notifying the at least one criterion towards the policy enforcement device;

determining a group session at the policy enforcement device;

transmitting a group session identifier for the group session from the policy enforcement device to the policy decision server;

associating, at the policy decision server, the user session for the user with a group session for the at least one criterion, wherein the group session is identified by the group session identifier;

determining, at the policy decision server, second policy control rules applicable for said group session;

downloading from the policy decision server towards the policy enforcement device the first policy control rules applicable for said user session and the second policy control rules applicable for said group session, and indicating respective events to be reported for the user session and for the group session;

installing, at the policy enforcement device, the received first policy control rules applicable for the user session and the received second policy control rules applicable for the group session, and associating the IP-CAN session for the user with the group session for the at least one criterion at the policy enforcement device; and applying at the policy enforcement device the first policy control rules applicable for the user session to the IP-CAN session for the user and applying the second policy control rules applicable to the group session for all IP-CAN sessions associated with the group session.

2. The method of claim 1, wherein the step of associating the user session for the user with the group session includes generating a new group session at the policy decision server for the at least one criterion, and generating the second policy control rules applicable for the new group session.

3. The method of claim 1, wherein the step of associating the user session for the user with a group session includes determining an already existing group session for the at least one criterion.

4. The method of claim 1, wherein the at least one criterion to monitor the user with the group of users is selected from a plurality of criteria including: type of subscription, location area, service usage, corporate users, and combinations thereof.

5. The method of claim 1, further comprising a step, which is responsive to an event, of submitting from the policy decision server towards the policy enforcement device an indication to either confirm, or modify, or terminate or replace the second policy control rules for the group session.

6. The method of claim 5, wherein the event to be responded is an event selected from a group of events including: events triggered from the policy enforcement device; internal events detected at the policy decision server; and events notified to the policy decision server from an external entity selected from a provisioning system, an Application Function device "AF", and both.

7. A policy decision server (PCRF) for providing network control of service data flows by making policy control decisions per user and service basis by downloading corresponding policy control rules towards a policy enforcement device (PCEF) in charge of handling and controlling resources in the bearer plane for a plurality of users, the policy decision server including:
- a receiver configured to receive an indication from a policy enforcement device (PCEF) indicating the establishment of a session for a user through an IP Connectivity Access Network (IP-CAN session);
- a generator configured to generate a user session for said user, and first policy control rules applicable for said user session;
- processing circuitry configured to determine at least one criterion to monitor this user along with other users in a group of users;
- output circuitry configured to download, towards the policy enforcement device, the first policy control rules applicable for the user session, and notify the policy enforcement device of the at least one criterion;
- the receiver being configured to receive from the policy enforcement device a group session identifier for the at least one criterion;
- the processing circuitry being configured to associate the user session for the user with a group session for the at least one criterion, wherein the group session is identified by the group session identifier, and determine second policy control rules applicable for said group session; and
- the output circuitry being configured to download, towards the policy enforcement device, the second policy control rules applicable for the group session, and indicate corresponding events to be reported for the user session and for the group session.

8. The policy decision server (PCRF) of claim 7, wherein the output circuitry is further configured to submit towards the policy enforcement device, responsive to an event, an indication to either confirm, or modify, or terminate or replace the second policy control rules for the group session.

9. The policy decision server (PCRF) of claim 7, wherein the processing circuitry cooperates with the generator and, where the group session identifier identifies a new group session, the generator is configured to generate the second policy control rules applicable for the new group session.

10. The policy decision server (PCRF) of claim 7, wherein the generator is further configured to generate a new group session for the at least one criterion, and to generate the second policy control rules applicable for the new group session.

11. The policy decision server (PCRF) of claim 7, wherein the processing circuitry is further configured to determine an already existing group session for the at least one criterion.

12. The policy decision server (PCRF) of claim 7, wherein the processing circuitry is further configured to handle criteria to monitor the user with the group of users selected from: type of subscription, location area, service usage, corporate users, and combinations thereof.

13. A policy enforcement device (PCEF) for installing policy control rules received from a policy decision server in order to handle and control resources in the bearer plane for a plurality of users, the policy enforcement device having:
- a receiver cooperating with processing circuitry to establish a session for a user through an IP Connectivity Access Network, (IP-CAN session); and
- output circuitry configured to indicate towards a policy decision server (PCRF) the establishment of the IP-CAN session for the user;
- a receiver configured to download from the policy decision server first policy control rules applicable to the IP-CAN session for the user, and receive a notification from the policy decision server indicating at least one criterion to monitor the user along with other users in a group of users;
- processing circuitry configured to assign a group session for the at least one criterion to monitor the user;
- the output circuitry being configured to submit towards the policy decision server a group session identifier for the group session;
- the receiver being configured to download from the policy decision server second policy control rules applicable for the group session, wherein the group session is identified by the group session identifier, as well as indications of respective events to be reported for the IP-CAN session and for the group session; and
- the processing circuitry is configured to install the first and second policy control rules, to associate the IP-CAN session for the user with the group session for at least one criterion to monitor the user along with other users in a group of users, and to apply the first policy control rules to the IP-CAN session for the user and the second policy control rules to all IP-CAN sessions associated with the group session.

14. The policy enforcement device (PCEF) of claim 13, wherein the output circuitry is configured to report, upon detection by the processing circuitry, the respective events.

15. The policy enforcement device (PCEF) of claim 13, wherein the receiver is further configured to receive an indication from the policy decision server to either confirm, or modify, or terminate, or replace the current second policy control rules applicable for the group session.

16. A non-transitory, computer-readable storage medium storing a computer program comprising executable code for carrying out the method steps according to claim 1 when running in a computer.

* * * * *